Jan. 17, 1950    W. N. BRAY    2,494,688
WORK GUIDANCE ASSISTANCE FOR MANUALLY
GUIDED MACHINE OPERATIONS
Filed Oct. 1, 1948    3 Sheets-Sheet 1

Inventor
William N. Bray
By his Attorney

Jan. 17, 1950

W. N. BRAY 2,494,688

WORK GUIDANCE ASSISTANCE FOR MANUALLY GUIDED MACHINE OPERATIONS

Filed Oct. 1, 1948

Inventor
William N. Bray
By his Attorney

Jan. 17, 1950 W. N. BRAY 2,494,688
WORK GUIDANCE ASSISTANCE FOR MANUALLY
GUIDED MACHINE OPERATIONS
Filed Oct. 1, 1948 3 Sheets-Sheet 3

Inventor
William N. Bray
By his Attorney

Patented Jan. 17, 1950

2,494,688

UNITED STATES PATENT OFFICE 2,494,688

WORK GUIDANCE ASSISTANCE FOR MANUALLY GUIDED MACHINE OPERATIONS

William Neil Bray, Leicester, England, assignor to United Shoe Machinery Corporation, Flemington, N. J., a corporation of New Jersey Application October 1, 1948, Serial No. 52,176
In Great Britain October 24, 1947

14 Claims. (Cl. 12—41)

This invention relates to improvements in or relating to machines adapted to operate on the margin of a work piece and more particularly to machines for operating upon an irregularly curved periphery, for example, the welt of a shoe, and having means for moving the said margin past the operating locality of a tool while the work piece is manually held and rotated by an operator to guide the periphery of the work piece past the tool at a predetermined angle thereto.

The invention is hereinafter illustrated, by way of example, as applied to a stitch separating machine of the type disclosed in United States Letters Patent No. 1,357,511, granted November 2, 1920, on an application filed in the name of Frederick H. Perry. It is to be understood that in its more general aspects the invention is not limited to use in machines of that particular character nor to the manufacture of shoes.

A stitch separating machine is adapted to emphasize indentations between adjacent stitches of a seam in a shoe part by means of a tool which, in the operation of the machine, is pressed into each indentation in turn. Stitch separating machines are usually employed to indent and emphasize the separation between stitches showing upon the upper surface of a shoe welt, such stitches constituting a seam by which the welt and an outsole are secured together. The term "shoe" is used herein to denote outer footwear generally.

Many stitch separating machines used in the manufacture of welt shoes are constructed in the same manner as the illustrative machine and have a rotary work table, a tool to which a four-way motion is imparted, and two presser feet disposed on opposite sides of the tool. In the operation of a machine of this type a welt shoe is presented to the machine, in the manner indicated in Fig. 3 of the drawings of the said Letters Patent, with the outsole supported by the work table and the two presser feet engaging in the crease between the welt and the shoe upper to position the welt transversely of the machine while the work is fed step-by-step from right to left across the front of the machine by the tool as the latter is pressed in turn into each indentation by the adjacent stitches. Usually the tool of a machine of this type is so arranged that, in operation, it serves to emphasize each indentation by forming a short, straight impression extending through it transversely of the welt, the tool terminating in a ridge extending transversely of the direction of feed.

Shoe manufacturers usually require that each such impression should extend normally, or substantially so, to the periphery of the welt so that the series of impressions is neat and uniform and enhances the appearance of the finished shoe. To accomplish this result, the shoe must be guided past the tool so that the periphery of the welt at the operating locality of the tool is substantially parallel to the direction of work feed. While the desired normality, or substantial normality, of the impressions to the edge of the welt can be insured by the operator maintaining the crease between the welt and the upper in engagement with both the presser feet during the whole period that the shoe is being operated upon by the machine, yet since it is not uncommon for an unskilled or inattentive operator to fail to maintain such engagement, especially around the toe end portion of the shoe, impressions are liable to be produced which lack the uniformity and neatness sought for, certain of their number being angularly misplaced and not extended normally, or substantially normally, to the periphery of the welt. Very frequently it is found that the operator has failed to maintain the crease in engagement with both presser feet due to having rotated the shoe, while the toe end portion of the shoe is being operated upon, at a rate not in correspondence with the rate at which the shoe is being fed past the presser feet by the tool; thus disparity between the rate of rotation of the work and the rate of work feed tends to produce undesirable results in the form of angularly misplaced impressions.

It is one of the various objects of the present invention to provide a stitch separating machine of the type referred to by the use of which a neat and uniform series of impressions substantially normal to the edge of a welted shoe may be produced without undue skill or attention on the part of the operator.

To this end the illustrative machine is provided with a C-shaped feeler member mounted beneath the presser feet for pivotal movement upon an upstanding pivot pin, the member having two forwardly extending gage arms arranged for engagement with the edge face of an outsole of a welted shoe presented to the machine. The pivot pin is mounted in a carrier block which is spring pressed forwardly to carry the gage arms into engagement with the outsole. Pivoting of the feeler member is arranged to control the speed of the machine, and the arrangement is such that when the shoe is presented to the machine in such a manner that the crease between the welt and the upper is in engagement with both presser feet, so that the normal to the edge of the welt at the operating locality of the tool extends forwardly and rearwardly of the machine at right angles to the direction of feed, the feeler member occupies a central position thereby adjusting the speed of the machine to a normal or base speed.

If, however, the operator rotates the shoe too fast in comparison with the rate of work feed, as, for example, while operating upon the toe portion of the shoe, so that only the right-hand presser foot remains in engagement with the shoe (with consequent risk that the tool will form impressions twisted substantially clockwise from the normal direction desired), the feeler member will swing counterclockwise and forward to maintain both gage arms in engagement with the work. Such counterclockwise swinging is effective, through electrical devices described hereinafter in detail, to cause the rate of feed of the work to be increased automatically. Such increase in the work feed is, in the illustrated machine, clearly audible to the operator and so not only reduces any disparity between the rate of work feed and the rate at which the operator is rotating the work, but also gives the operator aural indication that he is in fact rotating the work too fast so that he may effect correction manually. Similarly, if the operator rotates the shoe too slowly in comparison to the rate of work feed so that only the left-hand presser foot remains in engagement with the crease (with subsequent risk that the tool will form impressions twisted substantially counterclockwise from the normal direction desired) the feeler member will swing clockwise and forwards to maintain both gage arms in engagement with the work, such clockwise swinging being effective to decrease automatically the rate of feed of the work.

These and other features of the invention are described in detail in the following specification in connection with the accompanying drawings and are pointed out in the appended claims.

Except as is hereinafter described or shown in the accompanying drawings, the illustrative machine is a machine constructed and arranged in the same manner as the machine described in United States Letters Patent No. 1,357,511. Thus the illustrative machine comprises two presser feet 10 and 11, an operating tool 13, and a rotary work table 15. The table 15 is secured to a shaft rotatably mounted in a boss 17 having an arcuate tongue slidable in an arcuate guideway in a block 19.

Figure 5:
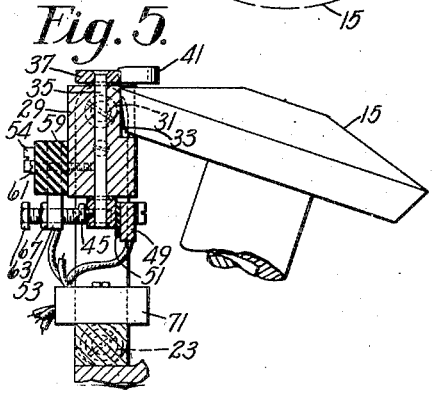
Fig. 5 is a vertical section on the line V—V of Fig. 3.

Fixed to the boss 17 is a horizontal bracket 21 to the opposite ends of which are fixed pivot studs 23, 23, upon which are pivoted upstanding arms 27, 27, the arms thereby forming a yoke and having their distal ends attached to opposite sides of a carrier block 29 by screws 31, 31. The block 29 has an arcuate recess 33 (Fig. 5) for accommodating the edge of the table 15.

Figure 3:
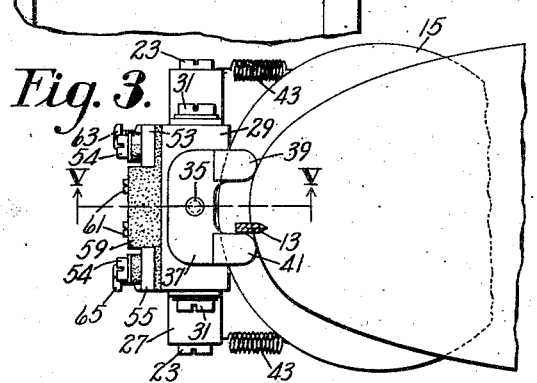
Fig. 3 is a plan view, partly in section, on the line III—III of Fig. 2.

The block 29 has an upwardly and downwardly extending bore which provides a bearing for a pivot pin 35, an upper end portion of which is fixed to a C-shaped feeler member 37 having forwardly extending gage arms 39, 41 (Fig. 3). The yoke is urged forwards by springs 43, 43 connected between the yoke and the boss 17 so that when there is work in the machine the gage arms 39, 41, which underlie the presser feet of the machine, are yieldably held in engagement with the periphery of the shoe sole. When there is no work in the machine the forward movement is limited by engagement of the block 29 with the edge of the table 15.

Figure 4:
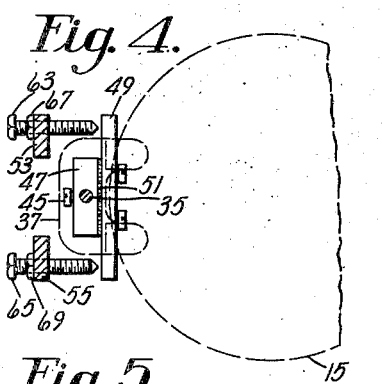
Fig. 4 is a plan view, partly in section, on the line IV—IV of Fig. 2.

A lower end portion of the pin 35 has fixed thereto, by a set screw 45, a metal block 47 (Fig. 4) to which is fixed, but in such a manner as to be insulated therefrom, a metal contact plate 49. A sheet of insulating material between the block 47 and the plate 49 is shown at 51. The arrangement is such that the feeler member 37 can execute free pivotal movement, in company with the contact plate 49, about the axis of the pin 35.

Fixed by screws 54 (Figs. 3 and 5) to the block 29, but in such a manner as to be insulated therefrom, are two depending lugs 53, 55, these lugs being spaced from the block 29 by, and being disposed at opposite ends of, a block 59 of insulating material fixed to the block 29 by screws 61, 61. Each lug 53, 55 has threaded therein one of a pair of adjustable contact screws 63, 65 having, respectively, lock nuts 67, 69 by which each screw may be secured in adjusted endwise position on a level with the plate 49.

Figure 1:
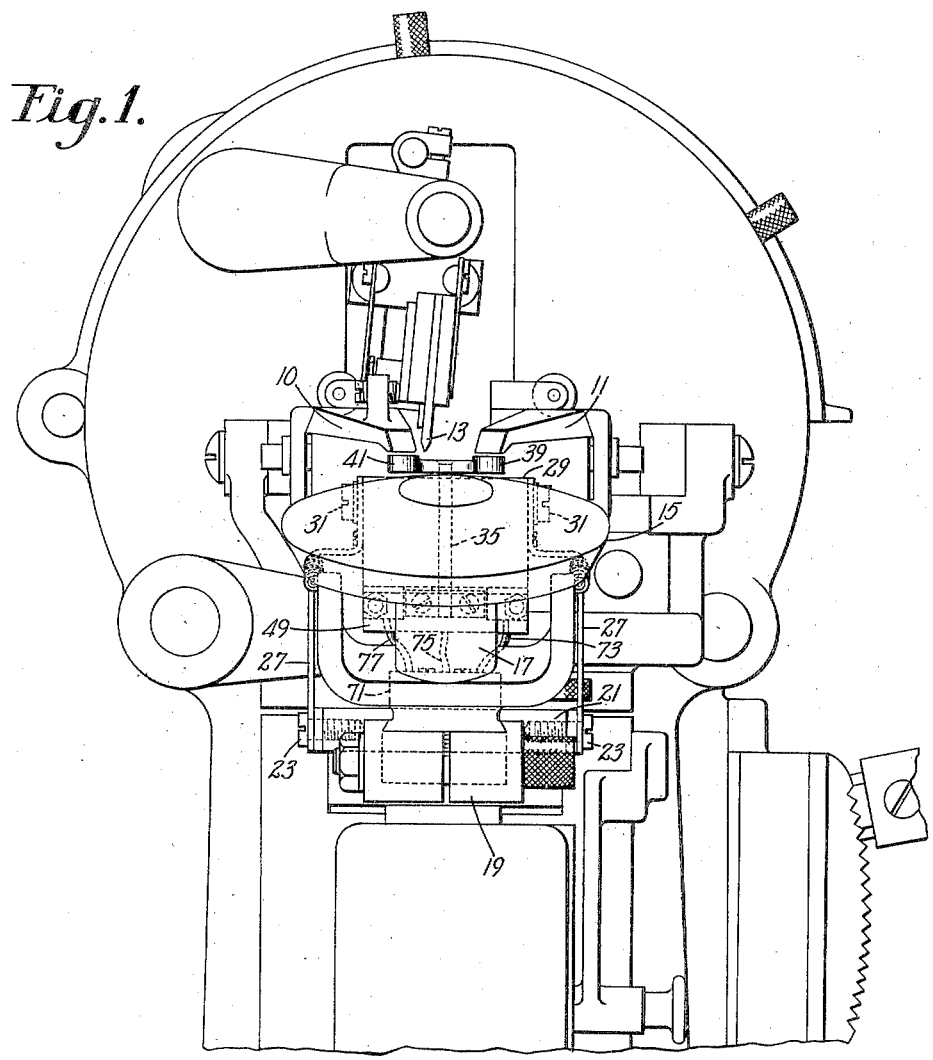
Fig. 1 is a front elevation of the upper portion of a stitch separating machine embodying the invention.
Figure 2:
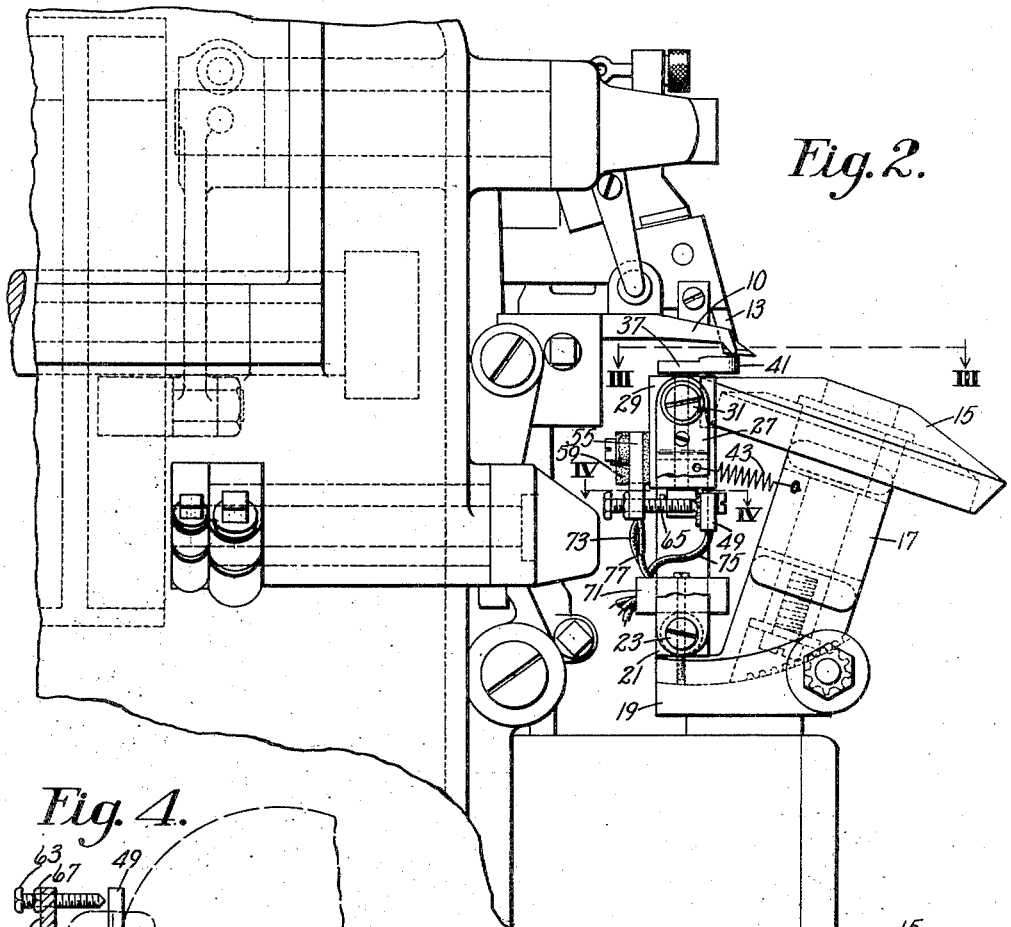
Fig. 2 is a side elevation of part of the illustrative machine.

Fixed to the bracket 21 is an insulated terminal block 71 to which are connected three leads 73, 75, 77 of flexible-insulated wire (Fig. 2). The lead 73 is connected to the lug 53, the lead 75 to a central point on the plate 49, and the lead 77 to the lug 55.

A main shaft of the illustrative machine is driven by a belt drive from a D. C. electric motor 100 (Fig. 6) comprising a field coil 102 and an armature 104. Current to drive the motor is derived from a conventional three-phase A. C. supply, the three-phase leads of the supply being shown at 106, 108 and 110, while the neutral lead is shown at 112. Two field thyratrons 114 and 116 supply from the leads 106 and 108 a unidirectional excitation for the field coil while three armature thyratrons 118, 120 and 122 connected to the leads 106, 108 and 110 supply unidirectional current to the armature 104. The current supplied to the field 102 remains substantially constant during operation by virtue of the connection of the grids of the field thyratrons to their respective anodes through current-limiting resistors. The grids of the armature thyratrons, however, are connected respectively to one end of the respective secondaries of transformers 124, 126 and 128 whose primaries are connected to the supply leads in such fashion that the phase of the voltage applied by each transformer to a thyratron grid lags in phase by one-third of a cycle, the anode voltage of that thyratron. The other ends of the transformer secondaries are connected together and via a grid bias lead 125 to a source of variable D. C. bias voltage by which the output of the thyratrons, and hence the speed of motor 100, may be controlled.

Figure 6:
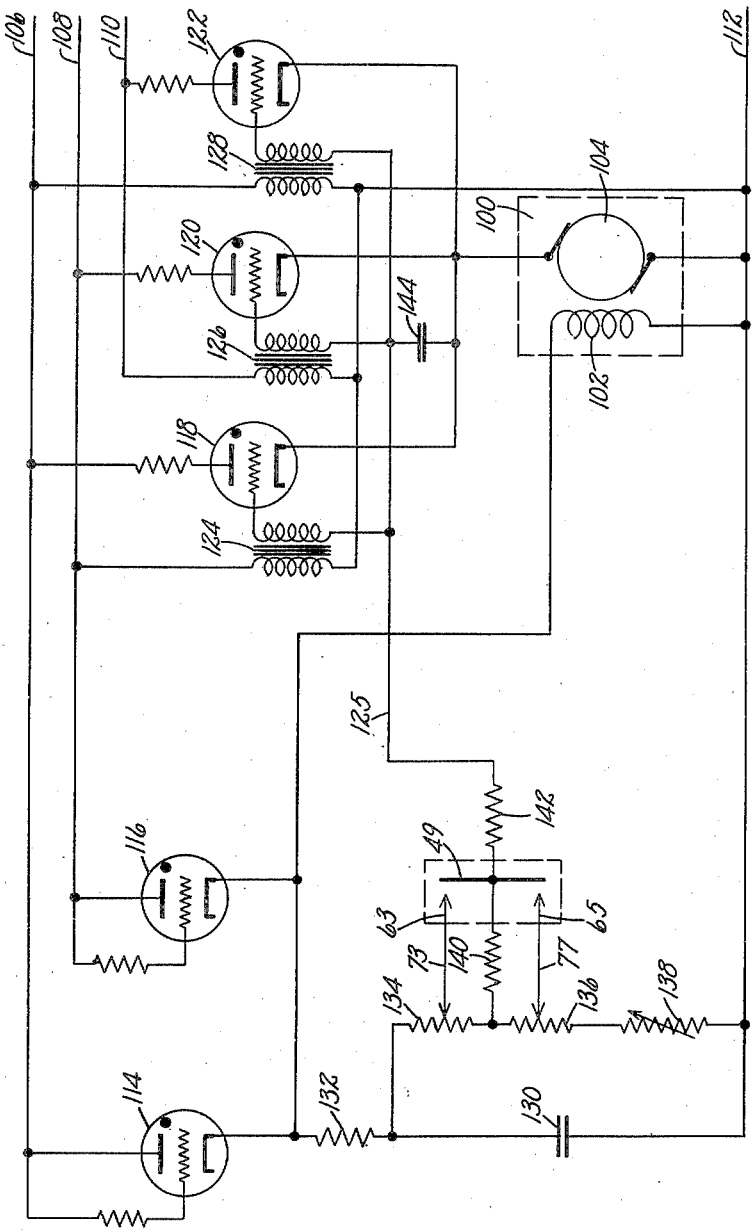
Fig. 6 is a circuit diagram showing the arrangement of certain electrical devices of the machine.

As shown in Fig. 6, a source of biasing voltage is provided from the field current thyratrons which charge a condenser 130 through a resistor 132. A voltage dividing network comprising the series-connected potentiometers 134, 136 and a variable resistor 138 is connected across the condenser 130. A junction point between the potentiometers 134 and 136 is connected by a resistor 140 to the lead 75 connected to the plate 49. The slider of potentiometer 134 is connected through lead 73 to the screw 63 while the slider of potentiometer 136 is connected through lead 77 to the screw 65. The switching established by the plate 49 and the screws 63, 65 is shown diagrammatically in Fig. 6. The plate 49 is connected through a resistor 142 to the grid bias lead 125.

When the motor 100 is running, each armature thyratron passes current in turn from one of the supply leads through the armature to the lead 112. A condenser 144 is connected between the cathodes of these thyratrons and the grid bias lead, and the passage of current through the tubes causes a negative grid bias to be built up across this condenser which bias tends to check any increase in the currents through the thyratrons. In opposition to this negative grid bias is the positive grid bias between the contact plate 49 and the lead 112. It will be clear that when the plate 49 is making contact with neither of the screws 63, 65, the positive grid bias referred to is at an intermediate level and the armature thyratrons will draw a moderate current corresponding to the normal or base speed of the motor. When the plate 49 makes contact with the screw 63, the positive grid bias will be increased, increasing the speed of the motor, and when the plate 49 makes contact with the screw 65, the positive grid bias will be decreased, causing decrease in the motor speed. The values of these speeds may be adjusted by varying the resistor 138 and the potentiometers 134 and 136, respectively.

In certain cases it may be desirable to provide, in lieu of three fixed speeds, a switching arrangement whereby the motor speed is continuously varied by the pivoting of the feeler member 37. In this case, as is obvious to those skilled in the art, instead of the switching arrangement described, the pin 35 may be connected to actuate the slider of a potentiometer connected across condenser 130, the slider being connected to the grid bias lead through the resistor 142.

In operation, a welt shoe having an outsole stitched to the welt thereof is presented to the machine with the outsole supported on the table 15 and the two presser feet entering the crease between the welt and the upper. The arrangement of the presser feet is such that when the crease is maintained by the operator in engagement with both presser feet as aforesaid, a line normal to the periphery of the welt at the locality of the operation of the tool 13 extends forwardly and rearwardly of the machine substantially at right angles to the direction of feed. While these circumstances prevail, the tool 13 can readily operate to make a uniform and neat series of impressions extending normally to the periphery of the welt.

The feeler member 37 will at this time be in engagement with the edge face of the outsole and will occupy a central position in which the plate 49 makes contact with neither of the screws 63, 65, so that the rate of feed of the work is the intermediate or base rate.

If, however, the operator rotates the shoe too fast, in comparison with the rate of work feed as, for example, in operating upon the toe end portion of the shoe, so that only the right-hand presser foot 11 remains in engagement with the crease, the feeler member 37 will swing counterclockwise and forward a little under the action of the springs 43, 43 to maintain both arms 39, 41 in engagement with the edge face of the outsole, thereby swinging the plate 49 into contact with the screw 63 with the result that the rate of feed of the work is automatically increased, reducing the disparity between the rate at which the operator is rotating the shoe and the rate of work feed, and at the same time giving the operator aural indication that he is, in fact, turning the work too fast (it will be realized that the change in the sound made by the illustrative machine when its speed changes is readily apparent). Similarly, if the operator turns the shoe too slowly in comparison with the rate of work feed so that only the left hand presser foot 10 remains in engagement with the crease, the feeler member 37 will swing clockwise bringing the plate 49 into contact with the screw 65 resulting in a decrease in the rate of work feed, which reduces the disparity between the rate at which the operator is rotating the shoe and the rate of work feed, and at the same time giving the operator aural indication that he is turning the work too slowly.

Although there has been described herein a preferred embodiment of the invention, other embodiments within the scope of the appended claims will be apparent to those skilled in the art. Accordingly, a broad interpretation of the appended claims commensurate of the scope of the invention within the prior art is desired.

Having described my invention, what I claim as new and desire to secure by Letters Patent of the United States is:

1. In apparatus for operating upon the margin of a work piece, said apparatus having a tool designed to operate in a predetermined angular relation to the periphery of said work piece as said margin and said tool are progressively moved relative to each other, the angle of presentation of the periphery to the tool being under the manual control of an operator, means for assisting the operator to maintain the predetermined angular relation between periphery and tool by giving warning of a discrepancy therein comprising means for determining the angular relationship between the periphery as presented to the tool and said tool, and means responsive to the position of the determining means for providing a warning signal when such a discrepancy exists.

2. Apparatus as in claim 1 in which said determining means comprises a pair of movable members for engaging the said periphery on opposite sides of the operating locality of said tool.

3. In apparatus for operating upon the margin of a work piece, said apparatus having a tool designed to operate in a predetermined angular relation to the periphery of said work piece, the angle of presentation of the periphery at the operating locality with respect to the tool being under the manual control of an operator, means for assisting the operator to present the work piece to the tool so that the periphery of said work piece is disposed in the predetermined angular relation to said tool comprising means for determining the angular relationship between the tool and the said periphery at the operating locality of the tool, and means responsive to the position of the determining means for providing a warning signal when a departure from the predetermined angular relationship exists.

4. In combination, a tool adapted for operating upon the margin of a work piece at a predetermined angle to the periphery thereof, means for feeding the margin of said work piece at a base speed progressively past the operating locality of said tool, and means for changing the speed of said feeding means responsively to relative displacement of the periphery of said work piece and said tool from said predetermined angle, said change of speed being in a direction tending to compensate for such angular displacement.

5. In combination, a tool adapted for operating upon the margin of a work piece at a predetermined angle to the periphery thereof, means for feeding at a base speed the margin of said work piece progressively past the operating locality of said tool, a pair of movable members for engaging the periphery of said work piece on opposite sides of said tool, and means responsive to relative movement of said members from a normal position for changing the speed of the feeding means in a direction tending to compensate for angular displacement of the work piece producing such relative movement.

6. In apparatus for operating upon the margin of a shoe, said apparatus having means for feeding said margin progressively past the operating locality of a tool designed to operate in a predetermined angular relation to the periphery of said shoe wherein said periphery at the operating locality is substantially parallel to the direction of work feed, said shoe being manually guided through said feeding means, means for assisting an operator guiding the shoe through said feeding means to maintain the periphery of the sole at the operating locality substantially parallel to the line of work feed comprising a pair of movable members disposed to engage the periphery of said sole on opposite sides of said operating locality for determining the angular relation between said tool and the periphery of said sole at the operating locality, means for maintaining said members in engagement with tse sole, and means responsive to relative movement of said members for changing the work feed speed to effect a compensating influence on the angle of presentation of the sole periphery to said tool.

7. In apparatus for operating upon the margin of a work piece, said apparatus having a tool designed to operate in a predetermined angular relation to the periphery of said work piece, said apparatus also having feeding means for moving the margin of the work piece past the operating locality of said tool while an operator controls the angle of presentation of the periphery to the tool to maintain said relation, means for assisting the operator to maintain said relation comprising a pair of movable members having surfaces for yieldingly engaging the edge of said work piece on opposite sides of the operating locality for determining the angular relation of the periphery and the tool at the operating point, and means responsive to relative movement of said members for changing the speed of the work feed to effect a compensatory change in the rate in which said feed tends to rotate the work piece.

8. In a stitch separating machine having a tool arranged to form upon the margin of a welt shoe presented thereto, a short, straight impression extending forwardly and rearwardly of the machine, having means for feeding the margin of said shoe transversely of the impression made by said tool, the angular position of said shoe while being so fed being under the manual control of an operator, means for assisting the operator to so guide the shoe through said feeding means as to maintain the impressions made by said tool upon the welt substantially normal to the periphery thereof comprising a feeler member having two spaced arms and being pivoted for movement in the plane of the shoe sole, means for moving said member for engagement of its arms with the periphery of the sole on opposite sides of the operating locality of said tool, and means actuated by pivoting of said member from a position in which the engaging surfaces of its arms are aligned with the direction of work feed for changing the speed of said work feed to reduce the discrepancy between such feed rate and the speed at which said operator is rotating the shoe and to give said operator aural warning of such misalignment.

9. In a stitch separating machine having a tool arranged to form upon the margin of a welt shoe presented thereto, a short, straight impression extending forwardly and rearwardly of the machine, having means for feeding the margin of said shoe transversely of the impression made by said tool, the angular position of said shoe while being so fed being under the manual control of an operator, means for assisting the operator to correlate the rate at which he is turning the shoe with the rate of work feed comprising a feeler member having gage arms for engaging the periphery of the shoe sole at opposite sides of the operating locality of said tool, means for supporting said feeler member to pivot in the plane of the shoe sole, means for yieldingly urging said supporting means to cause the arms of said feeler member to engage the periphery of the sole of a shoe being operated upon by the machine, an electric control actuated by pivoting of said plate member, and means operated by said control for increasing the speed of said work fed when said feeler member is pivoted in one direction from a central position and for decreasing such speed when said feeler member is pivoted in the opposite direction from said position.

10. A stitch separating machine having, in combination, a stitch separating tool, a work support, means for moving said tool to intermittently indent and feed the margin of a welted shoe presented to the machine, a pivoted feeler member adapted to engage the periphery of the shoe sole on opposite sides of said tool for determining the angular relation of the said periphery and the direction of the indentations made by the tool at the operating locality of said tool, and means responsive to the pivoting of said feeler member for changing the speed of work feed when there is a departure of said angular relationship from the normal.

11. Apparatus for operating upon the margin of a work piece, said apparatus having, in combination, a tool designed to operate in a predetermined angular relation to the periphery of said work piece, feeding means driven by an electric motor for moving the margin of said work piece past the operating locality of said tool, a pivoted feeler member having spaced gage arms for engaging the periphery of the work piece on opposite sides of the operating locality, spring means for urging said feeler member into engagement with said periphery, a bias-controlled rectifier for supplying direct current to the said motor whose speed is dependent upon the output of said rectifier, and bias controlling means actuated by the pivoting of said feeler member for selectively changing the value of the rectifier bias whereby displacement of the work piece due to disparity between the rate of feed speed and the rate of rotation may be reduced.

12. A stitch separating machine having a tool arranged to form upon the margin of a welt shoe, manually presented thereto and rotated by an operator, a short, straight impression extending forwardly to rearwardly of the machine, a rotatable work table for supporting said shoe, mechanism for moving said tool to indent and feed the welted margin of said shoe, presser feet disposed on opposite sides of the operating locality of said shoe for engaging the shoe in the welt crease when said shoe is in proper operating position, a pivoted feeler member having gage arms for engaging the periphery of the shoe sole on opposite sides of said operating locality, means for yieldingly urging said member into engagement with the shoe, and means responsive to the pivoting of said member when said shoe is out of engagement with a presser foot due to disparity between the rate of rotation of the shoe and the rate of work feed for changing the rate of work feed to reduce such disparity.

13. Apparatus as in claim 12 in which the pivoting of said feeler member actuates means for varying the amount of current supplied to a variable speed electric motor constituting the driving motor of the machine.

14. Apparatus adapted to operate upon the margin of a work piece presenting an irregularly curved periphery comprising operating means, feeding means arranged to engage and feed the margin of a work piece progressively past the locality of said operating means while the guidance of the work piece with respect to the direction of the normal to the periphery of the work piece at said locality is under the control of an operator, and means arranged to assist the operator in avoiding such disparity between the rate at which he is rotating the work and the rate of feed of the margin of the work piece as would cause said normal to vary substantially from a desired direction during operation of the machine, said assisting means automatically varying the rate of feed to reduce such disparity between the two rates which may arise from the manner in which the operator guides the work.

WILLIAM NEIL BRAY.

No references cited.